United States Patent
Bortz et al.

Patent Number: 5,644,422
Date of Patent: Jul. 1, 1997

[54] TECHNIQUES OF RADIATION PHASE MATCHING WITHIN OPTICAL CRYSTALS

[75] Inventors: Michael Louis Bortz, Palo Alto; Martin Michael Fejer, Menlo Park, both of Calif.; Marc David Levenson, Boulder, Colo.

[73] Assignee: New Focus, Inc., Santa Clara, Calif.

[21] Appl. No.: 587,331

[22] Filed: Jan. 16, 1996

[51] Int. Cl.$^6$ .................................................. G02F 1/35
[52] U.S. Cl. ............................................ 359/326; 359/332
[58] Field of Search ......................................... 359/326–332

[56] References Cited

U.S. PATENT DOCUMENTS

| | | | |
|---|---|---|---|
| 3,962,576 | 6/1976 | Kuhl et al. | 359/326 X |
| 4,187,027 | 2/1980 | Bjorklund et al. | 356/400 |
| 5,036,220 | 7/1991 | Byer et al. | 359/328 |
| 5,093,832 | 3/1992 | Bethune et al. | 372/21 |
| 5,115,336 | 5/1992 | Schildkraut et al. | 359/263 |
| 5,193,023 | 3/1993 | Yamada et al. | 359/245 |
| 5,253,102 | 10/1993 | Okazaki | 359/328 |
| 5,457,707 | 10/1995 | Sobey et al. | 359/330 X |

OTHER PUBLICATIONS

Data Sheets, "Analog Devices –Low Cost Reference Oscillator AD2S99," *S/D Converters*, pp. 3–101 thru 3–103, (No Date!).

Kuhl et al., "A Frequency Doubled Dye Laser With A Servo-Tuned Crystal," *Optics Communications*, vol. 13, No. 1, pp. 6–12 (Jan. 1975).

Bjorklund et al., "Servo Tuning and Stabilization of Non-linear Optical Crystals," *IEEE Journal of Quantum Electronics*, vol. QE–15, No. 4, pp. 228–232 (Apr. 1979).

Fejer et al., "Quasi–Phase–Matched Second Harmonic Generation: Tuning and Tolerances," *IEEE Journal of Quantum Electronics*, vol. 28, No. 11, pp. 2631–2654 (Nov. 1992).

Helmfrid et al., "Theoretical Study of a modulator for a waveguide second–harmonic generator," *Journal of the Optical Society of America B–Optical Physics*, vol. 10, No. 3, pp. 459–468 (Mar. 1993).

*Primary Examiner*—John D. Lee
*Attorney, Agent, or Firm*—Majestic, Parsons, Siebert & Hsue

[57] ABSTRACT

A non-linear crystal is used as an optical radiation frequency converter. Its efficiency is optimized though control of one or more operating conditions that include the temperature of the crystal, its angular relationship with incident radiation and an electric field bias in which the crystal operates. The relative phase between radiation incident upon the crystal and that generated by it is adjusted by a servo loop which controls one or more of these operating conditions. The servo loop responds to a cyclic variation in the output radiation which occurs when the crystal is not operating at an optimal efficiency. A quasi-phase matched (QPM) crystal is preferred. Several specific crystal structures are described. The technique has an application in a frequency doubler, among others.

24 Claims, 10 Drawing Sheets

TECHNIQUES OF RADIATION PHASE MATCHING WITHIN OPTICAL CRYSTALS

BACKGROUND OF THE INVENTION

This invention relates generally to the use of non-linear optical mixing crystals, and, more specifically, to the use of such crystals to double the frequency of coherent optical radiation.

Non-linear optical crystals are used in many ways in optical technologies, a principal application being doubling of the frequency of an incident laser beam through generation within the crystal of a second harmonic. Another application is to generate radiation which has a frequency equal to the sum or difference of the frequencies of two incident radiation beams. There are many materials that have been used or suggested over the years for use as a mixing crystal, such as KTP ($KTiOPO_4$), lithium tantalate ($LiTaO_3$), and lithium niobate ($LiNbO_3$). It is common to use such crystals to double the frequency output of a laser. This allows the use of long wavelength lasers, such as those in the infrared region of the spectrum, in a system that generates light in the green or blue portion of the spectrum with such a mixing crystal being used as a second harmonic generator (SHG). Such a SHG crystal is also used with a tunable laser, thereby to provide a frequency double coherent radiation source which is tunable over some range. One application of such a tunable system is in spectroscopy, where the interaction with a material sample with a coherent radiation source scanned over a predetermined frequency range is desired.

As is well known, the phases of the incident radiation and the radiation generated within the crystal are desirably matched to maximize the efficiency of its operation. This provides a maximum output intensity for a given input intensity. Phase matching is required since the incident and generated radiation travel at different speeds through the crystal. The refractive index of the crystal is different for the two radiation waves. This results in destructive interference of the two waves within the crystal if nothing is done about it. One phase matching technique used with a birefringent type of crystal involves polarizing the incident wave such that the orthogonally polarized second harmonic wave sees the same refractive index. The cause of the destructive interference is then eliminated between the two polarized waves, and the efficiency of operation of the crystal is optimized.

A second type of non-linear mixing crystal utilizes quasi-phase-matching (QPM). The relative phase of the incident and generated waves are corrected within the crystal at regular intervals by forming the crystal to have a structural periodicity along a direction of travel of the waves. One type of periodic structure modulates the sign or magnitude of the non-linear coefficient through the material. In a specific form, the sign of the non-linear coefficient is alternated along the length of the crystal at intervals related to the coherence length of the radiation. In ferroelectric crystals like $LiNbO_3$, $LiTao_3$ and KTP, the regions of opposite sign are correlated with the direction of the ferroelectric domain, the act of creating a region of opposite sign is termed "domain inversion", and the structure as a whole is termed a "periodically poled" device. A dimension of each region in the direction of radiation propagation is usually made to be equal to one coherence length of the interference in the crystal. The principles underlying operation of such QPM crystals are given in a paper, Fejer et al., "Quasi-Phase-Matched Second Harmonic Generation Tuning and Tolerances," *IEEE Journal of Quantum Electronics*, Vol. 28, No. 11, November, 1992, pps. 2631–2654, which is incorporated herein by this reference.

More recently, QPM crystals have been formed by the use of integrated circuit processing technology. A film is lithographically delineated on the surface of the crystal into a grating with a periodicity designed to achieve quasi-phasematching for a set of desired conditions. In one class of fabrication techniques, the film is used to facilitate the spatially periodic application of a high voltage electric field that induces periodic domain inversion. In another class of fabrication methods, the film is diffused into the surface of the crystal and the act of diffusion, combined with appropriate thermal processing, induces domain inversion. Specific forms of such devices are described in U.S. Pat. No. 5,036,220 of Byer et al. (1991), which is incorporated herein by this reference. The specific material processing resulting in domain inversion is not critical to operational aspects of this patent.

It is a general object of the present application to operate non-linear mixing crystals at their maximum conversion efficiency.

It is a more specific object of the present invention to provide a system for controlling an operating parameter of a non-linear mixing crystal in order to maximize its conversion efficiency under varying operating conditions.

It is another object of the present invention to provide a combination of a tunable laser and a non-linear crystal which operates at a maximum conversion efficiency, as a second harmonic generator, over the tunable frequency range of the laser.

It is a further object of the present invention to operate a non-linear crystal at a maximum conversion efficiency when being used to generate a radiation beam having a frequency that is either a sum or differences of the frequencies of two input laser beams.

It is yet another object of the present invention to provide an improved structure of a non-linear mixing crystal that is more easily controllable to operate at its maximum conversion efficiency.

It is yet a further object of the present invention to provide structures of QPM crystal units that are easy to fabricate for use as the non-linear crystal in such systems.

SUMMARY OF THE INVENTION

These and additional objects are accomplished by the present invention, wherein, briefly and generally, the non-linear crystal is subjected to a cyclic variation of an operating parameter that causes a small cyclic variation in its conversion efficiency. The conversion efficiency of the crystal is, in effect, being dithered. Examples of operating parameters which may be varied in this manner to so affect the conversion efficiency include the temperature of the crystal, its electric field bias, an angular relationship with the incident radiation beam, and the stress to which the crystal is subjected. An error signal is developed by comparing the output radiation beam with a driving signal which causes the cyclic variations in the operating parameter. A servo control system maintains the error signal at zero by adjusting the steady state value of a crystal operating parameter. The operating parameter so controlled can be the same as the parameter that is cyclically varied, or one of the others that affects the crystal operating efficiency.

In examples described hereinafter, the crystal conversion efficiency is cyclically varied by driving a pair of conductive plates adjacent the crystal with a voltage from an oscillator. A resulting oscillating electric field through the crystal, in effect, dithers the crystal conversion efficiency. The output intensity variation is compared in phase with the oscillator signal in a manner to provide an error signal as part of a servo loop. The error signal is used to maintain an operating parameter at a level which minimizes the error signal, and thus maximizes its conversion efficiency. The operating parameter so controlled in the examples described hereinafter is the temperature of the crystal.

According to a second principal aspect of the present invention, a QPM crystal is employed as the non-linear crystal in such a servo system by being subjected to a cyclically varying electric field. Even though it is a generally recognized goal in making a QPM crystal that the lengths of the regions (domains) of different non-linear coefficient signs or magnitudes along the length of travel the radiation be equalized, it has been found that a slight imperfection in this characteristic which often exists in such crystals results in a sufficient degree of modulation of the crystal's conversion efficiency for use in a servo control system. If this inherent crystal characteristic is not sufficient to give the desired result, the crystal can be specifically engineered to cause regions of one sign or magnitude predominate slightly. The period of the variation (two regions, one of each polarity or magnitude), however, is maintained to be twice the coherence length of interfering radiation in the crystal, thereby not adversely affecting the degree of phase matching within the crystal.

Additional objects, advantages and features of the various aspects of the present invention will become apparent from the following description of its preferred embodiments, which description should be taken in conjunction with the accompanying drawings.

DESCRIPTION OF THE PREFERRED EMBODIMENTS

Figure 1:
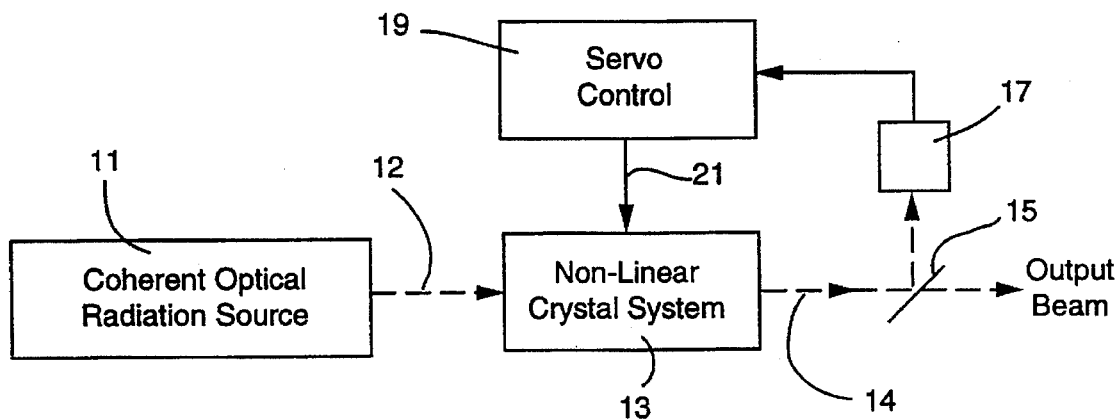
FIG. 1 schematically and generally shows an optical radiation system utilizing the various aspects of the present invention.

Referring initially to FIG. 1, an electro-optical system utilizing the present invention includes a source 11 of a coherent optical radiation beam 12 that is directed into a non-linear mixing crystal 13. The term "optical radiation" used herein is meant to refer to that portion of the electromagnetic energy spectrum including visible radiation, infrared radiation, ultra violet radiation and radiation of adjacent wavelength regions. This range extends about from 1 nanometer to 15,000 nanometers but, more typically, will be in a range of 50 to 1500 nanometers. The radiation source 11 is typically a laser, either a type having a single wavelength coherent output beam 12 or which is tunable to adjust the wavelength of the output beam 12 over a small range. A gas laser, dye laser, diode laser or other type of solid state laser may be employed, the particular type not being critical to operation of the non-linear crystal system 13.

Figure 2:
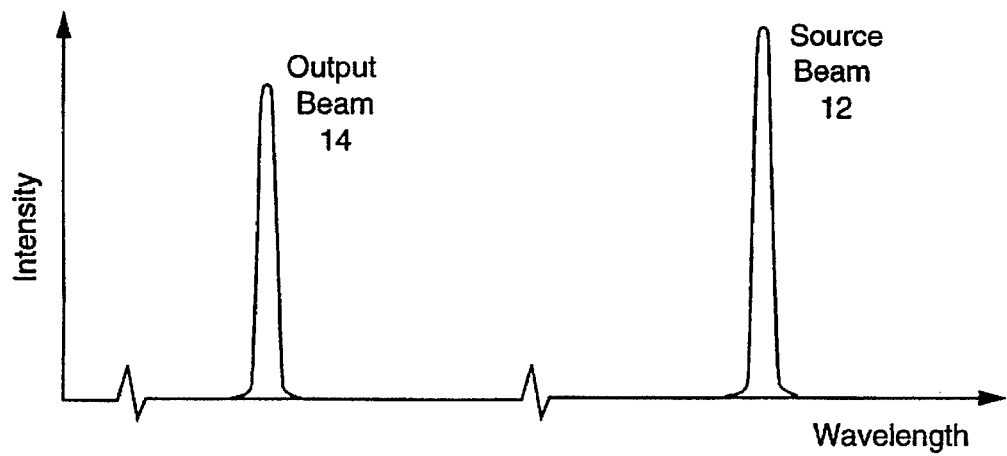
FIG. 2 shows source radiation wavelengths emanating from the system of FIG. 1, when used as a second harmonic generator.

In this example, the crystal 13 operates as a second harmonic generator, thereby to generate and emit an optical radiation beam 14 having a frequency that is twice that of the radiation beam 12. (See FIG. 2) The efficiency of this energy conversion is dependent upon various electric, magnetic and physical conditions. That is, the intensity of the output beam 14, for a given intensity of the input beam 12, will change as various operating conditions and parameters change. These include, but are not limited to, the temperature of the crystal, the level of electric field through the crystal, the physical orientation of the crystal with respect to the input beam 12 and the level of any mechanical stress placed upon the crystal. Of course, it is almost always desired to operate the crystal at its maximum conversion efficiency.

Such an optimization may be obtained by a feedback control loop which monitors the a characteristic of the output beam 14 in order to control one or more of these operating conditions or parameters to maintain the crystal system 13 operating at maximum efficiency. For this purpose, a beam splitter 15 is positioned in the output beam 14 in order to reflect a small portion of the intensity of the output beam into a photodetector 17. An electrical signal output of the photodetector is received by a servo control system 19 to develop a controlled signal in circuits 21 which controls one or more of the operating parameters of the crystal system 13 which effects its efficiency. The servo control system automatically adjusts the one or more parameters when a characteristic of the output beam 14 being monitored indicates that the crystal system 13 is not operating at its maximum efficiency.

The automatic optimization of the SHG system of FIG. 1 is useful in any application where the operating environment is subject to change. Even when a laser used as the coherent source 11 is of a fixed frequency, its output wavelength can drift over time due to variations in the temperature of the laser or for other reasons. Use of the automatic control system assures that an operating parameter of the SHG crystal is being changed to maintain a high energy conversion efficiency.

Figure 3:
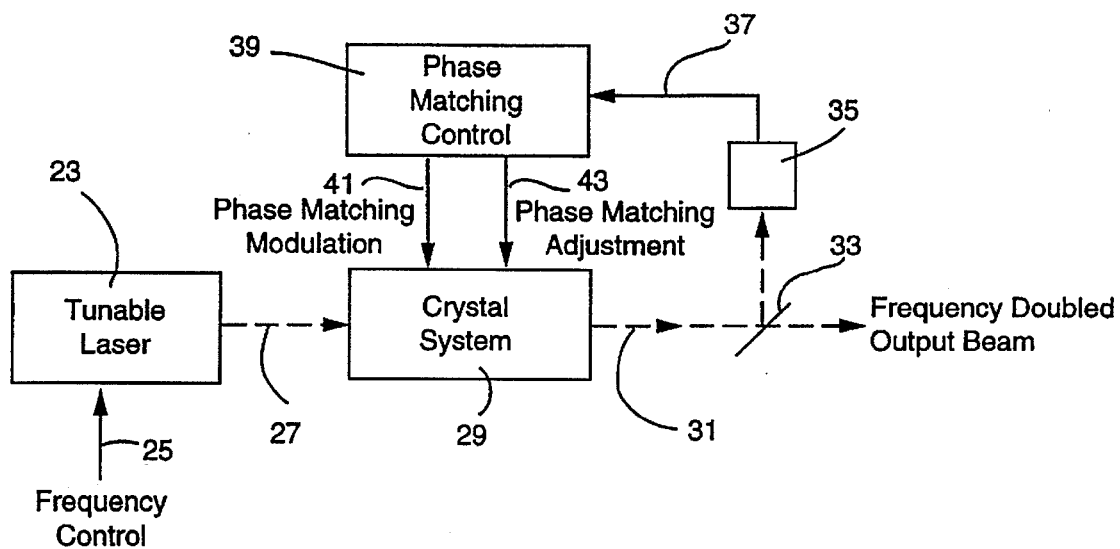
FIG. 3 shows a more specific system according to the present invention, which provides a variable frequency doubled output.

FIG. 3 shows a more specific system. A tunable laser 23 responds to a frequency control signal 25 to generate a coherent optical radiation beam 27 with a frequency that is controllable over a limited range. An example of such a laser is a diode laser whose output beam is incident upon a diffraction grating that is mechanically tuned to obtain the desired coherent output beam frequency. The frequency is continuously tunable over this range. Diode lasers are commonly available with outputs in the red or near infrared region of the optical radiation spectrum. One such diode laser is tunable over a range of 780 to 800 nanometers. Of course, the present invention is applicable to any range of optical radiation.

When the laser beam 27 is applied to a non-linear crystal system 29, an output beam 31 at twice the frequency is generated. For the example of the laser beam 27 being tunable over a range of 780 to 800 microns, the beam 31 generated by the crystal system 29 is tunable over a range of 390 to 400 nanometers. This is in the blue region of the optical radiation spectrum. A coherent source tunable over this range is useful for many applications such as spectroscopy.

In order to maintain the crystal system 29 operating at a maximum efficiency as the output wavelength of the laser 23 and other operating conditions change, a portion of the output beam 31 is reflected by a beam splitter 33 onto a photodetector 35 of a type appropriate for the particular wavelength of the output beam 31. An electrical signal in a circuit 37 from the output of the photodetector 35 is proportional to the intensity of all the optical radiation that it receives. It is unnecessary for the photodetector 35 to be sensitive to the intensity distribution or position of the radiation incident upon it. This signal is applied to a control system 39 which interfaces with the crystal system 29.

Although it may appear that all the control system 39 has to do is adjust an operating parameter of the crystal system 29 in order to maximize the intensity of the output beam 31, this does not provide enough information for the control system 39 to know which direction to adjust the crystal operating parameter(s) to restore a diminished output. Therefore, one such crystal operating parameter is modulated by a signal from the control system 39 through a circuit 41. The control system 39 monitors the effect of that modulation on the output beam 31 and thus adjusts the same or some other crystal operating parameter through the circuit 43 to cause the effects of the modulation in the output beam 31 to be maintained at some level. The effect on the output beam 31 now has a sign which indicates which direction the controlled operating parameter should be adjusted.

In a specific example being described, the modulating signal in the circuit 41 modulates an electric field in which the crystal operates within the system 29, and the temperature of the crystal is controlled in response to the feedback signal in the circuits 43. However, any operating parameter which affects the efficiency of conversion of the crystal may either be modulated and/or controlled to maximize the conversion efficiency. Other such operating parameters include the angle at which the input beam 27 enters the crystal and the mechanical stress under which the crystal operates. Although the specific example given below modulates one operating parameter and controls another, it is also possible to modulate and control the same crystal operating parameter such as temperature or level of electric field. The modulation, in effect, dithers the crystal conversion efficiency at the frequency of the modulation. It is when the level of dithering in the output beam 31 is minimized, according to the specific example being described, when the non-linear crystal is operating at its maximum conversion efficiency. The crystal control system does not need any other input signal but rather operates automatically as the frequency of the laser 23 is tuned.

Figure 4:
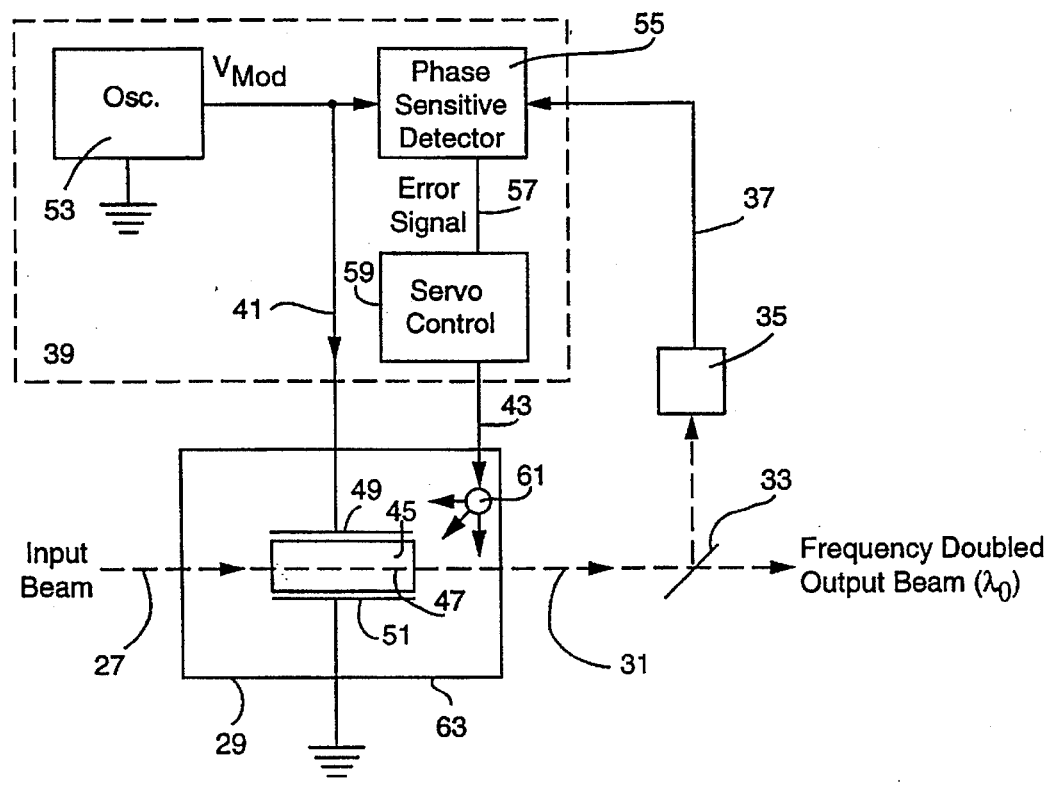
FIG. 4 shows a specific implementation of a portion of the system of FIG. 3.

The mechanisms affecting the conversion efficiency of non-linear mixing crystals are extensively discussed in the literature. The degree of phase matching, and thus the conversion efficiency of the crystal, is affected by a number of operating parameters including those discussed above. FIG. 4 shows a specific implementation of the system of FIG. 3. The crystal system 29 includes a non-linear mixing crystal 45 having an axis 47 extending along a direction in which the input beam 27 and output beam 31 travel within the crystal. The crystal is bounded by a pair of conductive plates 49 and 51 that are electrically connected to an output of an oscillator 53 that is part of the control system 39. These plates and oscillator provide a cyclicly varying electrical field through the crystal 45 which thus cyclicly varies the degree of phase matching of the input and output beams within the crystal 45, and thus cyclicly varies the conversion efficiency of the crystal. The output voltage $V_{MOD}$ is preferably a sine wave having a frequency within a range of from 1 to 1000 KHz, 10 KHz being convenient to use. The material of the crystal 45 is selected from a number of those discussed in the literature as appropriate for mixing or second harmonic generation in coherent optics, lithium niobate, lithium tantalate, or KTP being examples.

A phase-sensitive detector 55, also known as a lock-in amplifier, receives a modulating signal output of the oscillator 53 and the electrical signal output of the photodetector 35. These signals are compared and an error signal developed in a circuit 57. An appropriate oscillator 53 is a commercially available integrated circuit chip product from Analog Devices, its part no. AD2S99, while an appropriate phase sensitive detector 55 is a commercially available integrated circuit chip product from Analog Devices, its part no. AD630. However, other devices which perform similar functions are available from a number of vendors. This error signal drives a servo control circuit 59 which, in turn, provides the control signal in circuits 43. In this case, the control circuits 39 drive a heater/cooler 61 that is in thermal communication with the crystal. A thermal compartment 63 is shown in FIG. 4 as providing a temperature controlled environment for the crystal 45. However, a preferred implementation of the example of FIG. 4 provides a crystal 45 in a waveguide on a thin substrate, that substrate being attached to a thermoelectric cooler that is driven by the signal in the circuit 43.

Figure 5:
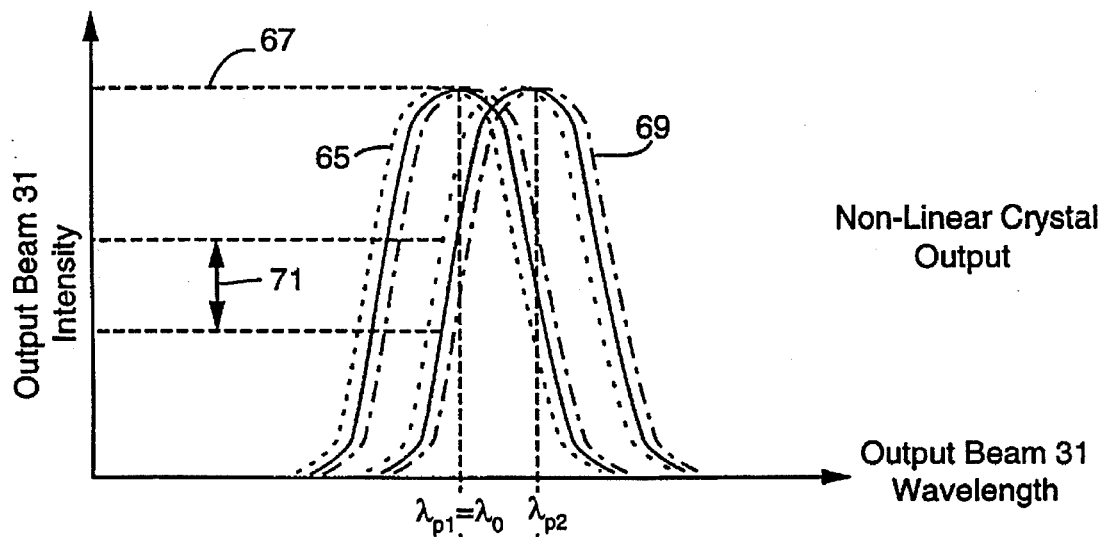
FIG. 5 shows operating characteristics of a non-linear crystal utilized in the system of FIG. 4.
Figure 6:
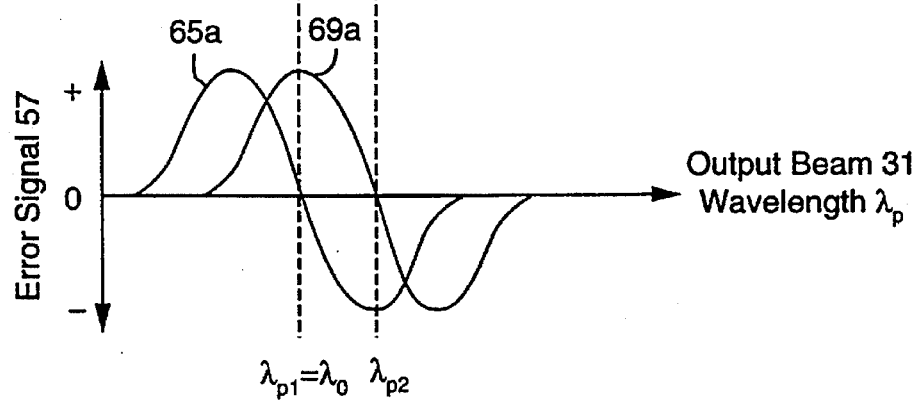
FIG. 6 illustrates an error signal in a servo loop within the system of FIG. 4.
Figure 7:
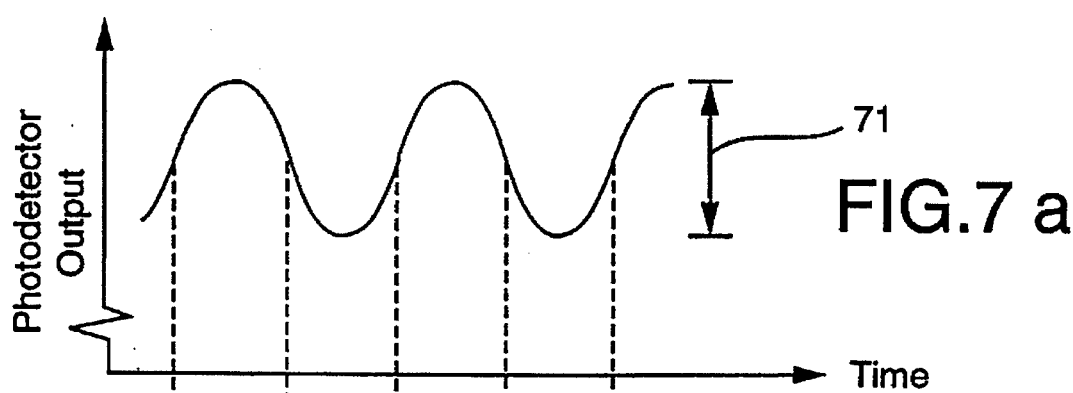
FIG. 7A, 7B and 7C are curves which additionally illustrate operation of the system embodiment of FIG. 4.
Figure 7:
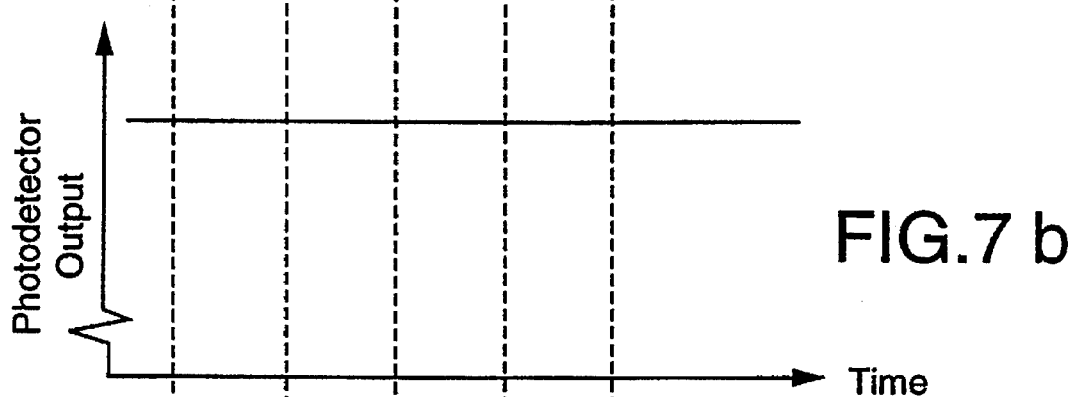
Figure 7:
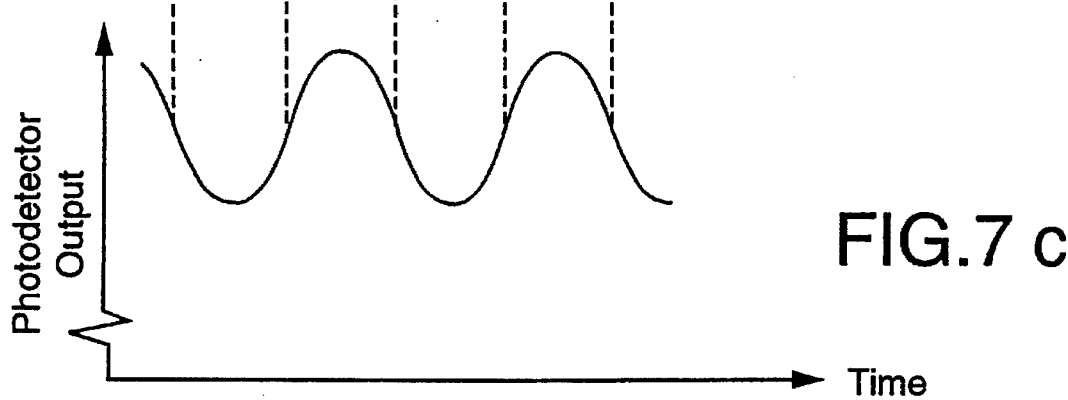

FIGS. 5–7 help illustrate the operation of the control system shown in FIG. 4. Curves 65 show the crystal efficiency response verses incident laser wavelength for a set of particular crystal operating parameters. In this discussion we focus on temperature as the crystal operating parameter that is controlled to achieve maximum conversion efficiency, although other operating parameters may be controlled. The broken lines on either side of the solid line of the curves 65 show the limits of efficiency variation (dither) caused by the cyclically varying electric field in the crystal. The crystal response is maximized at wavelength $\lambda_{p1}$, corresponding to an output beam 31 at a maximum 67. At the laser wavelength $\lambda_o = \lambda_{p1}$ the dithering of the conversion efficiency with oscillator 53 results in a negligible temporal variation of the output beam 31 as detected by photodiode 35, as shown in FIG. 7B.

A second set of curves 69 show the crystal efficiency response verses incident laser wavelength for a crystal operating temperature different from curves 65. The broken lines on either side of the solid line of the curves 69 show the limits of efficiency variation caused by the cyclically varying electric field in the crystal. The crystal response is maximized at wavelength $\lambda_{p2}$, corresponding to an output beam 31 at a maximum 67. At a wavelength $\lambda_o$ different from and less than $\lambda_{p2}$, dithering the conversion efficiency results in a component of the output beam 31, as detected by photodiode 35, which varies at the frequency of oscillator 53 with a peak to peak magnitude represented by line 71. (The relative magnitude of the variation is exaggerated for illustration purposes.) The temporal output of this signal is shown in FIG. 7A. If the operation wavelength $\lambda_o$ is different from and greater than $\lambda_{p2}$, a similar situation occurs, and the output signal is shown in FIG. 7C. The difference between FIGS. 7A and 7C is the phase of the alternating component of the photodiode output relative to the phase of the modulation provided by oscillator 53.

It is always desirable to operate the crystal at maximum efficiency. This is achieved by electronic processing of the photodiode output illustrated by the curves in FIG. 7A–7C into an appropriate error signal that can be sent to the control system of FIG. 4 to change the crystal operating temperature to achieve maximum efficiency, during which the crystal efficiency response verses incident laser wavelength will change from curves 69 to curves 65. The appropriate error signal is generated sending the photodiode output to the phase sensitive detector 55 that can sense the phase of the alternating signal component of the photodiode output 37 at the modulation frequency relative to the phase of the oscillator output signal at $V_{mod}$. The error signal output 57 of the phase sensitive detector verses incident laser wavelength is shown in FIG. 6 for the crystal at two different sets of crystal operating parameters. Curve 65a and 69a in FIG. 6 correspond to curves 65 and 69 in FIG. 5, respectively. When the crystal is operated at maximum efficiency at wavelength $\lambda_o=\lambda_{p1}$, as illustrated by curves 65 and 65a, the error signal is zero. When the optimum operating efficiency is at a wavelength $\lambda_{p2}>\lambda_o$, as shown by curves 69 and 69a, the error signal is positive. This error signal is fed back to the control system to change the crystal operating parameter such that the error signal is driven to zero. This is accomplished by changing the crystal operating temperature such that the crystal response evolves from curves 69 to 65. When the optimum operating efficiency is at a wavelength $\lambda_{p2}<\lambda_o$, (not shown) the error signal is negative, and this error signal is fed back to the control system to change the crystal operating parameter in the opposite direction when compared to the case illustrated by curves 69 and 69a such that the error signal is driven to zero. The key characteristic of this error signal is that it has a sign (positive or negative) associated with it that provides the servo control system 59 with enough information to know whether the crystal operating parameter should be increased or decreased to drive to the error signal to zero.

Figure 8:
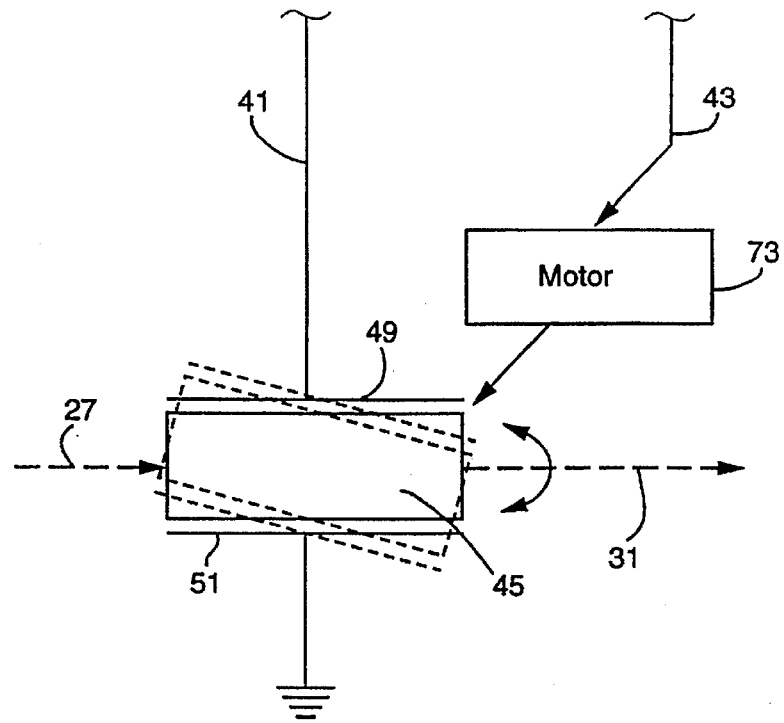
FIGS. 8 and 9 show modifications of the system of FIG. 4.

As a modification of the system of FIG. 4, FIG. 8 provides a control, through a motor source 73, an angle of the elongated axis of the crystal 45 with respect to the input beam 27. It is at angle that is the crystal operating condition that is being modified to maintain the conversion efficiency at a maximum. The modulation remains applied by a cyclicly varying electrical field. Another variation, shown in FIG. 9, similarly modulates the conversion efficiency by the alternating electrical field but controls a level of a DC electric field across the crystal 45 through control of a DC bias source 75 that is also connected across the electrodes 49 and 51. The electric field across the crystal 45 is thus maintained at a bias level that maximizes the conversion efficiency of the crystal.

Figure 10:
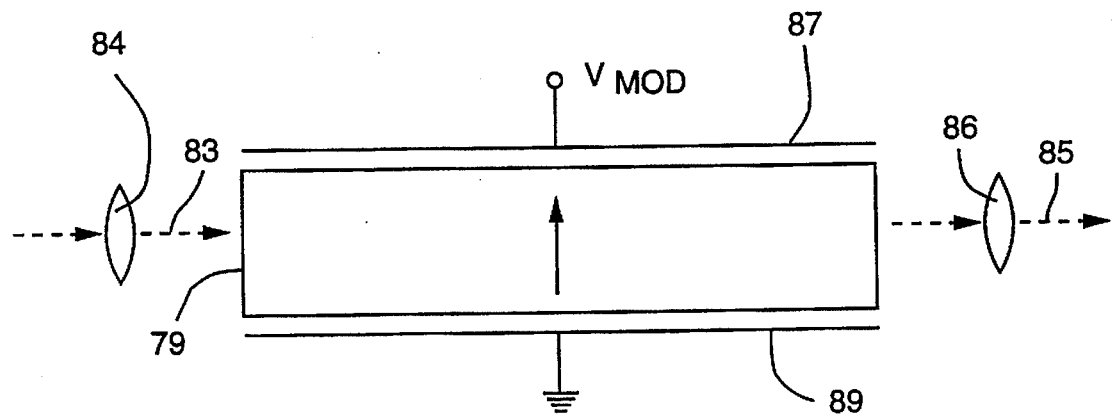
FIG. 10 illustrates a bulk crystal for use in any of the embodiments of FIGS. 4, 8 or 9.

Specific characteristics of the crystal utilized in the foregoing embodiments have not yet been addressed. One suitable class of crystals include bulk crystals, a crystal 79 of FIG. 10 being an example. An input coherent beam travels through the bulk of the crystal 79, which generates an output beam at a wavelength different from the input beam. For second harmonic generation, the output beam is at one-half the wavelength of the input beam. An optical system 84 may be used to confine and focus the input beam to the central portion of the crystal, and an optical system 86 may be used to collimate and direct the output beam in a desired manner. When the crystal 79 is used in the systems described above, it is placed between two planar electrodes 87 and 89 that receive the modulating voltage $V_{MOD}$ in order to cyclicly vary the electric field through the entire body of the crystal. The crystal 79 is of a type that uses birefringent phase matching. However, it may be preferable to use a QPM crystal because of a variety of reasons, including, but not limited to, a higher operating efficiency or room temperature operation.

Figure 11:
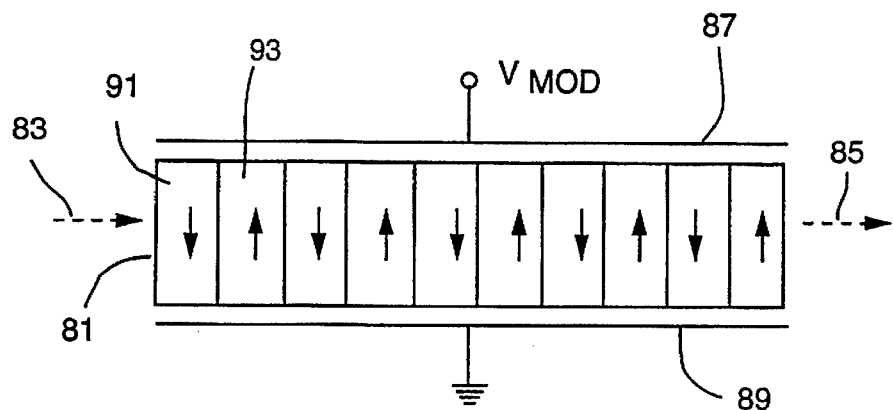
FIG. 11 illustrates a QPM crystal for use in any of the embodiments of FIGS. 4, 8 or 9.

FIG. 11 illustrates a bulk QPM crystal. The crystal 81 is formed of a number of regions (domains) with alternating polarities of their non-linear coefficients. For example, a region 91 has a non-linear coefficient of one sign, an adjacent region 93 of an opposite sign, and so forth along the length of the crystal. The signs of the individual regions are indicated by either an upward pointing arrow or downward pointing arrow.

However, as can be recognized by those familiar with QPM crystals, a perfect implementation of such a crystal will not substantially respond with a dithered output intensity in response to a varying electric field applied equally to all regions between the plates 87 and 89. It is a goal of making a QPM crystal that each region has the same width, a width that is related to the coherence length of the radiation within the crystal. Such a perfect crystal 81, therefore, would not work well in the system of FIG. 4. The equal and opposite regions of different polarity will cause effects of the varying electric field to be cancelled out, thus not providing the desired modulation (dithering) in the output beam 85.

Figure 12:
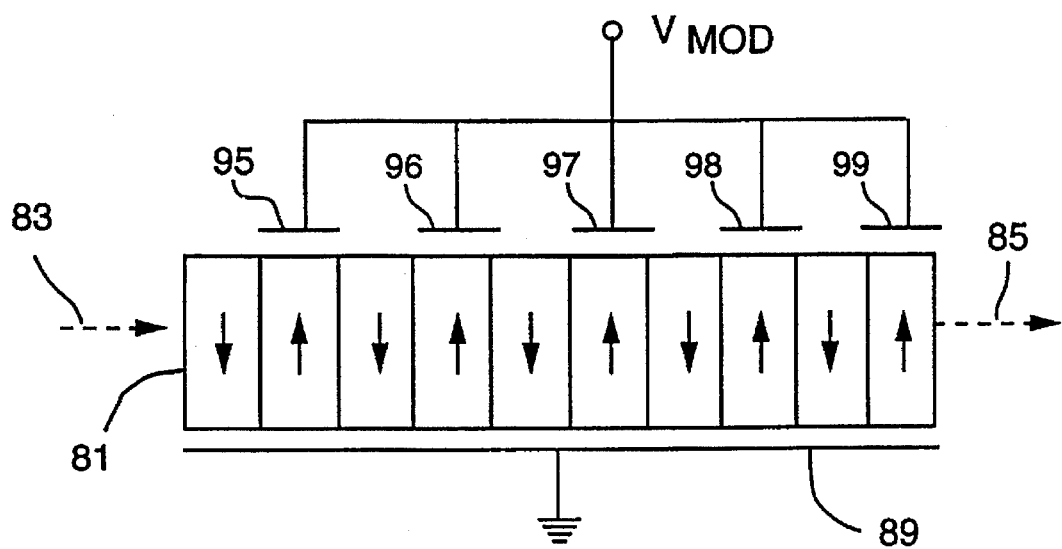
FIGS. 12, 13 and 14 illustrate various modifications of the QPM crystal of FIG. 11.

One way to use such a perfect crystal 81 is to apply the electric field across those regions of the crystal of one non-linear coefficient polarity but not across the regions of the other polarity. This is shown in FIG. 12 where separate electrodes 95–99 are positioned adjacent the regions of the same polarity. However, the manufacturing of such a structure can be difficult, particularly when microelectronic techniques are utilized to form the crystal on a small substrate. Further, the electric field will not be uniform across the crystal between the opposing electrodes, and, as a result, can adversely effect the optical frequency conversion process. The electric field will have a periodic variation across the top in a direction of its length but will be nearly uniform along the bottom.

It turns out in practice that crystals of the type of the crystal 81 usually do not turn out perfectly. It has been found that the existence of only a very small imperfection in the desired equality of the lengths of the regions of opposite polarity is sufficient to result in a level of intensity modulation of the output beam that is sufficient to allow use of the "perfect" QPM crystal with the planar electrodes 87 and 89 in the servo systems described above. Thus, very often, nothing different needs to be done in making a crystal for such applications.

Figure 13:
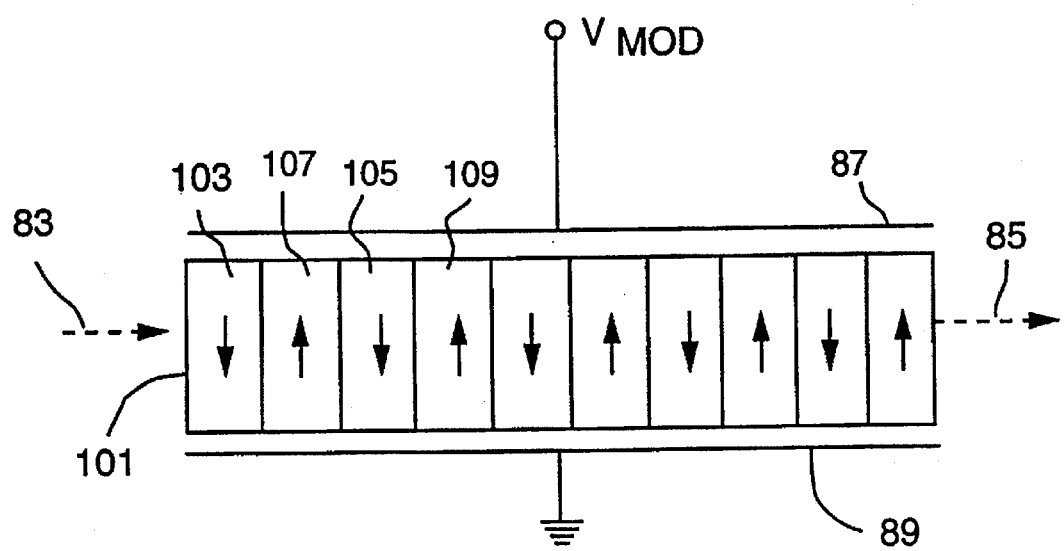

However, in order to make sure that any given crystal of a batch of crystals is suitable for use in the servo control applications described herein, a variation in lengths of the regions (domains) can be intentionally introduced. FIG. 13 shows a QPM crystal 101 that has been made to have each of its regions with one polarity of the non-linear coefficient longer than those of the other. For example, regions 103 and 105 of one polarity are made to be longer than adjacent regions 107 and 109 of the opposite polarity. The differences in lengths of the different polarity regions is exaggerated in FIG. 13 for ease of illustration. It has been found that only a small departure from a one-to-one duty cycle is sufficient. Planar electrodes extending along the entire length of the crystal may then be used, which are much easier to fabricate than the intermittent electrodes 95–99 of the embodiment of FIG. 12.

In any event, period of variation along the length of the crystal 101 is maintained constant and related to the coherence length. That is, in order to maintain the desired quasi-phase matching characteristic of the crystal, the lengths of each pair of adjacent regions of opposite polarities is the same and equal to two coherence lengths. This pattern exists throughout the length of the crystal, resulting in the total proportion of the length of the crystal having one polarity being much different than the remaining length of the other polarity. The alternating electric field formed between the electrodes 87 and 89, extending across a large number of such regions, will thus create a net dithering of the output beam 85 when used in the embodiment of FIG. 4.

Figure 14:
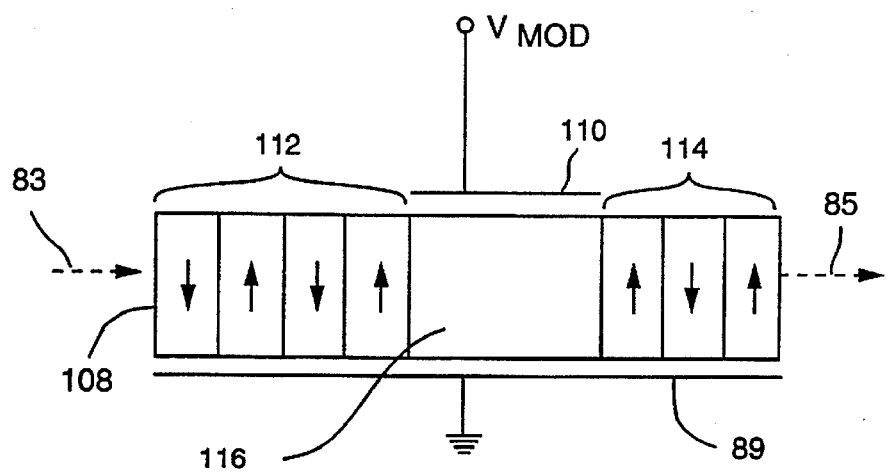

Another bulk QPM crystal embodiment is shown in FIG. 14. A crystal 108 is provided with two nominally perfect QPM gratings 112 and 114, separated by a uniform region 116. This region is not birefringently phase matched. That is, the light waves propagate in the region 112 without any appreciable non-linear effects occurring. An electrode 110 extends only along the uniform region 116. Hence, a change in the refractive index due to an applied electric field occurs only in this region. In this structure, the specific phase relationship between the inputed and internally generated waves as they enter the second QPM grating region 114 determines whether or not the desired output wavelength continues to increase in power in the region 114. This is controlled by the phase shift in the central, uniform region 116. Therefore, application of an electric field in the central region 116 changes the intensity of the output beam 85, and can thus be used for dithering.

In each of the structures shown in FIGS. 10–14, the electrodes 87, 89, 110 and 95–99 may be formed by evaporating, or otherwise depositing, an appropriate metal. The metal may be deposited directly on the crystal, or isolated from the crystal by air (as shown in FIGS. 10–14) or a layer of some other dielectric.

Figure 9:
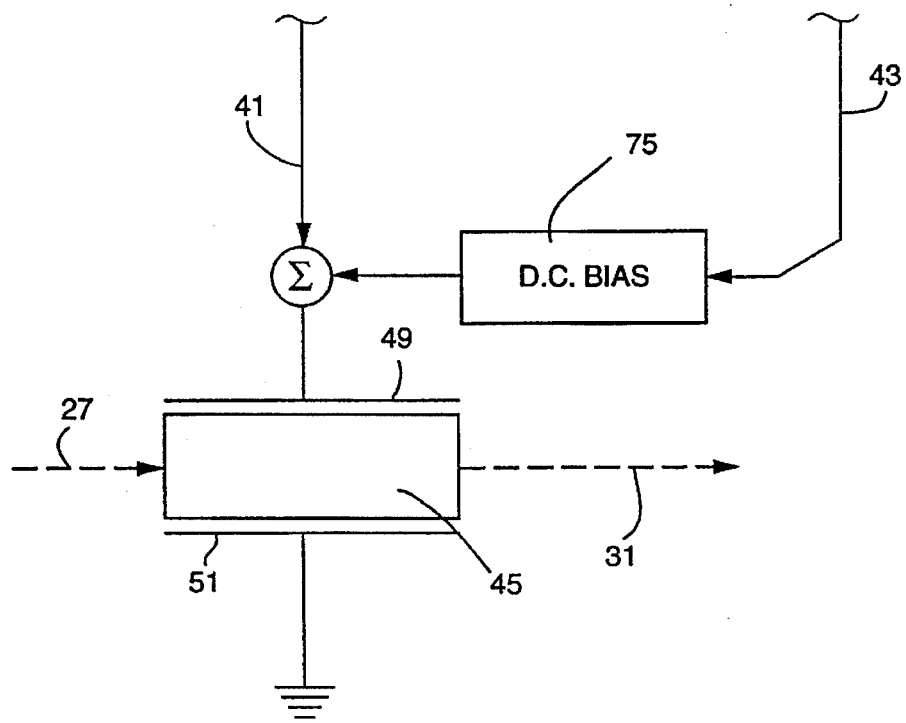

Various specific arrangements of another type of crystal, which may be employed in any of the systems of FIGS. 4, 8 and 9, are illustrated in FIG. 15–18. A QPM crystal is formed as a waveguide, which increases the efficiency of the frequency conversion process that is an advantage for use with low power lasers. As with the bulk crystal embodiments discussed above, a nominally ideal QPM waveguide grating can be used with planar electrodes on the top and bottom of the crystal. Periodically patterned electrodes, or electrodes that are only patterned on the top of the crystal, are unnecessary. Of course, it may be desirable to put the electrodes only on top of the crystal. The electrodes may be continuous along each side of the channel waveguide, in analogy to the electrode on the top and bottom of the bulk crystal, and the perturbation to the quasi-phasematching characteristic is achieved via the non-ideal equalities of the lengths of the regions of opposite polarity.

Figure 15:
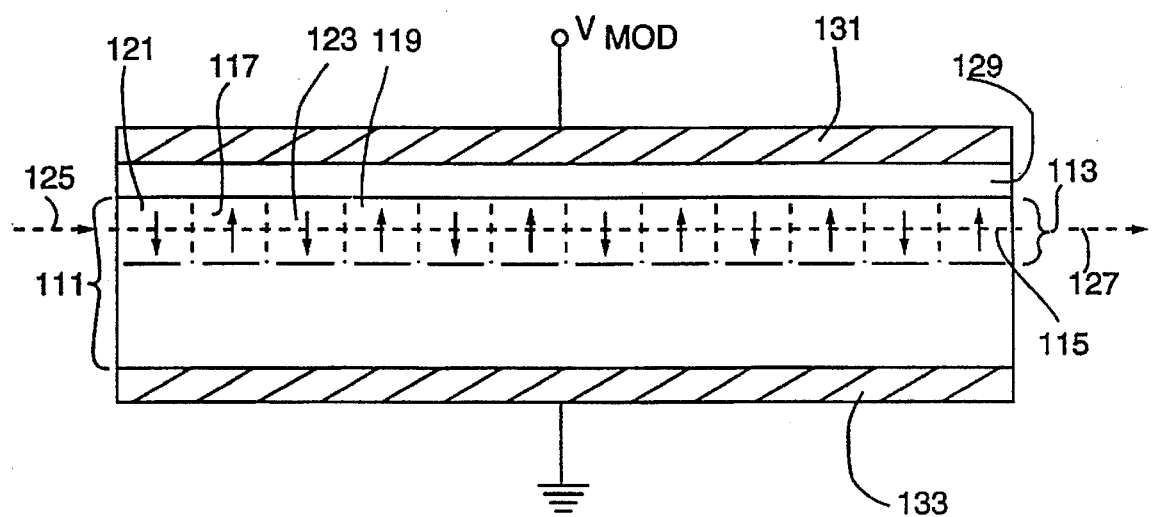
FIGS. 15–18 show various forms of a QPM crystal formed on a substrate, for use in any of the embodiments of FIGS. 4, 8 or 9.

Referring to FIG. 15, a thin crystal substrate 111 has an optical waveguide channel 113 formed in one surface. The substrate 111 may be of a ferroelectric crystalline material such as lithium niobate, lithium tantalate or KTP with the waveguide 113 formed in a surface by a proton exchange process. Such a structure and process of making it are described in aforementioned U.S. Pat. No. 5,036,220. The specific techniques used for creating the domain inversion grating are not critical to the operation of the automatic phase matching control described herein. However, the primary difference between the structure shown in FIG. 15 and that of this patent is that the length of each of the alternating polarity regions along an axis 115 of the channel are unequal, in the same manner described with respect of FIG. 13. That is, regions 117 and 119, having the same non-linear coefficient sign, are wider than adjacent regions 121 and 123, having an opposite sign of its non-linear coefficient. This inequality can be specifically engineered, or a small inequality inherent in "perfect" QPM crystals can be utilized, in the same manner as discussed above for the bulk crystal embodiments of FIGS. 11 and 13. Incident light from a laser is directed along a path 125 and the frequency doubled output generated within the waveguide 113 exits along a path 127.

Light travels along the waveguide 113 as it does along an optical fiber, being multiply reflected from its sides. An interface between the waveguide channel 113 and the rest of the substrate 111 separate regions of different refractive index and thus brings this about. An open side of the waveguide 113 is covered with a layer 129 of an appropriate optical material that has a different refractive index than that of the channel 113 in order to serve as light guiding cladding for the channel. The layer 129 may be, for example, optically clear Teflon. On an opposite side of the layer 129, which may be firmly attached thereto, is a metallic layer 131 that extends a full length of the waveguide 113 and serves as an electrode for creating an electric field across the channel 113. Although the maximum control signal is obtained with the electrode 131 extending across the entire waveguide, it need not do so to function properly. A second electrode 133 is positioned on an opposite side of the substrate 111 and may be held in contact therewith. As with the bulk crystal embodiments of FIGS. 10–14, the electrode 131 can be alternatively deposited directly onto the crystal, or can be separated from it by a layer of air. In any event, the modulating voltage $V_{MOD}$ is applied across the metal electrode layers 131 and 133. The structure of FIG. 15 is then substituted for the crystal 45 and electrodes 49 and 51 of any of FIGS. 4, 8 or 9. Operation of the crystal in that system is then as described previously.

Figure 16:
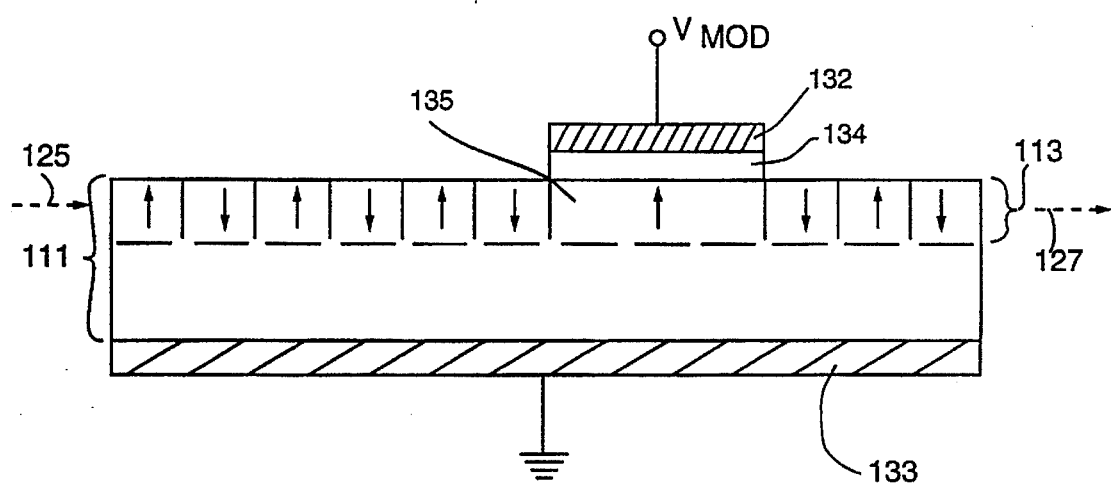
Figure 17:
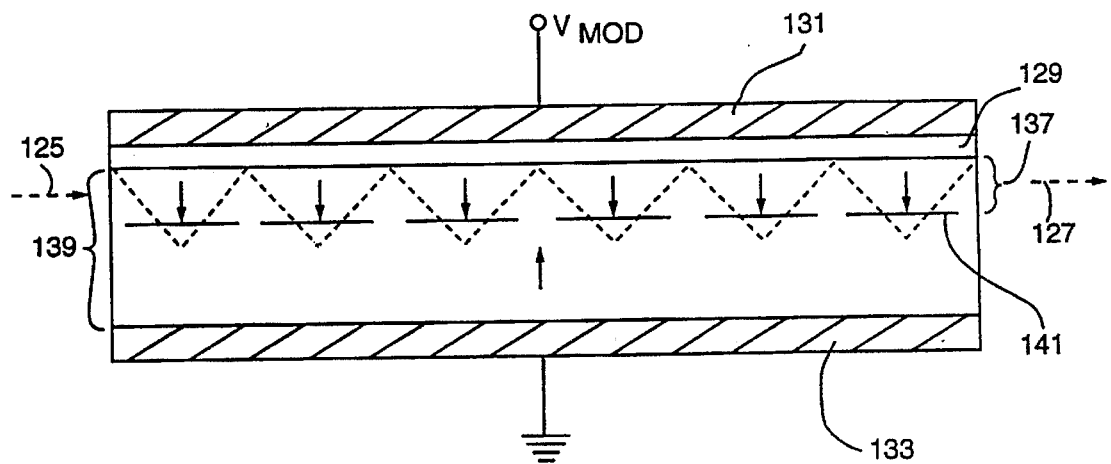
Figure 18:
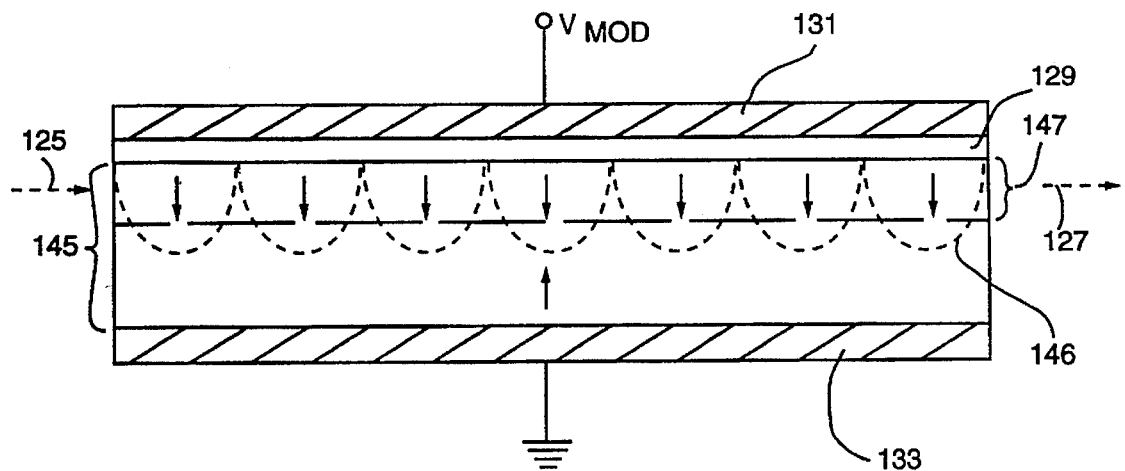

A modification of the waveguide form of crystal is shown in FIG. 16. This is a waveguide version of the bulk crystal embodiment of FIG. 14. Two nominally perfect QPM gratings within a waveguide 113' are separated by a region 135 of the crystal. An electrode 132 is positioned over this uniform region, being separated from the crystal by a layer 134 of dielectric.

The embodiments of FIGS. 15 and 16 shows the different regions (domains) of the crystal to have a uniform length as a function of their depth into the crystal. Although this is desirable, the diffusion techniques commonly used to fabricate QPM crystals for waveguide based interactions often result in domains that have a triangular or hemispherical shape, as respectively illustrated in FIGS. 17 and 18. A crystal 139 (FIG. 17) includes a waveguide 137, and a crystal 145 includes a waveguide 147. As can be seen from these illustrations, the effective lengths of the alternate polarity domains vary along the lengths of the waveguides, thus making these structures also suitable for use in the above servo control applications. The relative effective opposite polarity lengths is affected by the depths of the waveguide portions 137 and 147, which have respective bottom interfaces 141 and 146.

Figure 19:
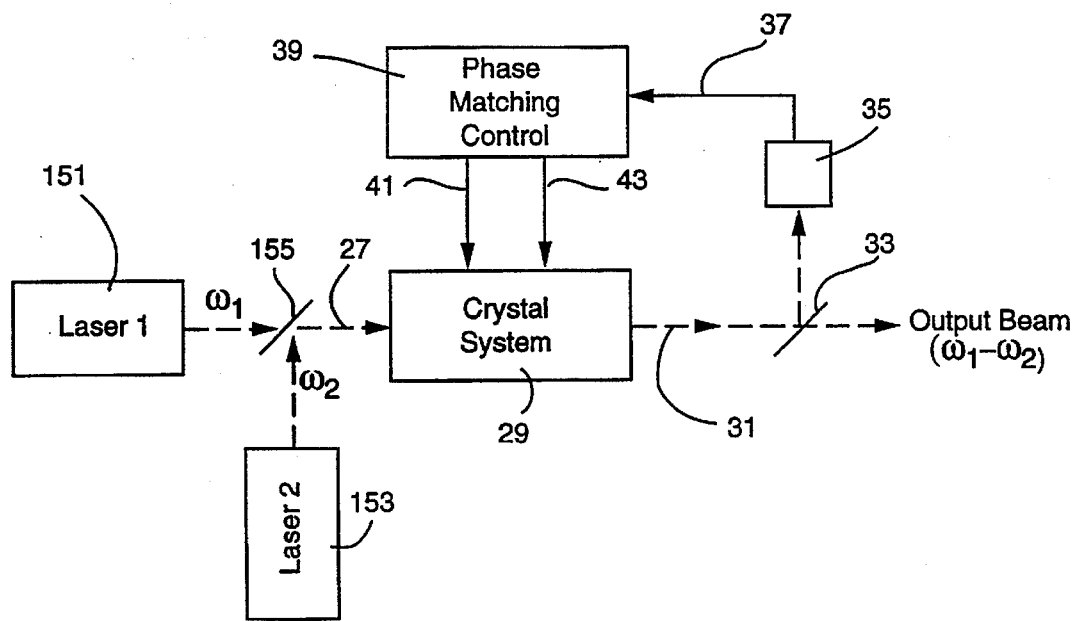
FIG. 19 shows another implementation of the system of FIG. 1 which can utilize appropriate ones of the crystal structures illustrated in FIGS. 10–18.

The discussion of the preferred embodiments has, to this point, been directed primarily to frequency doubling applications. Other applications also exist where operation of one of the various crystal structures herein by modulating an operating characteristic is an improvement. One additional application is shown in FIG. 19, where the reference characters of FIG. 3 are used to identify similar portions. The crystal system 29 here receives coherent optical radiation beams of different frequencies from two lasers 151 and 153. The two beams are combined by appropriate optics 155, and applied to the crystal system 29 as a combined beam 27'. A result is an output beam 31' that contains a component which has a frequency that is a sum or difference between the frequencies of the radiation from the lasers 151 and 153. The same type of system can also be used to derive a radiation beam with a frequency that is a sum of that of the two input beams.

In all of the embodiments described herein, the optical radiation is passed once through the crystal, in a "single pass" non-linear frequency conversion process. In other embodiments not shown herein, appropriate ones of the crystals described above can be positioned between two mirrors so that the optical wave passes back and forth many times through the crystal.

Although the various aspects of the present invention have been described with respect to its preferred embodiments, it will be understood that the invention is entitled to protection within the full scope of the appended claims.

It is claimed:

1. A method of converting the frequency of optical radiation, comprising:

directing input optical radiation into a non-linear crystal, thereby to generate output radiation having a frequency that is different than the frequency of the input optical radiation, cyclically altering an operating parameter of the crystal in a manner to generate a corresponding cyclic intensity variation in the output radiation when a conversion efficiency within the crystal between the input radiation to the output radiation is not maximized, while generating substantially no cyclic intensity variation in the output radiation when said conversion efficiency is substantially maximized, monitoring the output radiation in order to measure any of said cyclic intensity variation therein, and in response to monitoring some substantial magnitude in said output radiation cyclic intensity variation, adjusting a condition of operation of the crystal in a manner to cause the cyclic intensity variation to approach substantially zero.

2. A method according to claim 1 wherein the adjustment of a condition of operation includes adjusting at least one of the temperature of the crystal, angle of propagation of the input radiation with respect to the crystal or a bias electric field in which the crystal operates.

3. A method according to claim 1 wherein the input radiation is directed into a birefringently phase matched type of crystal.

4. A method according to claim 1 wherein the input radiation is directed into a quasi-phase matched type of crystal.

5. A method according to claim 4 wherein the input radiation is directed into a crystal that is periodically poled along a direction of travel of optical radiation therein.

6. A method according to claim 4 wherein the input radiation is directed into a waveguide formed within the crystal.

7. A method according to claim 1 wherein the cyclic alteration of an operating parameter includes cyclically altering an electric field through at least a portion of the crystal.

8. A method according to claim 7 wherein the adjustment of a condition of operation includes adjusting the temperature of the crystal.

9. A method according to claim 7 wherein the input radiation is directed into a crystal of a type having a plurality of regions along a length thereof, in a direction of propagation of the radiation, which have non-linear coefficients of opposite signs alternately therealong, and the electric field is cyclically altered through the crystal by application of a cyclically varying voltage across electrodes on opposite sides of the crystal which extend a distance along a length of the crystal that extends across a plurality of said regions.

10. A method according to claim 9 wherein the input radiation is directed into a waveguide formed within the crystal.

11. A method according to claim 7 wherein the input radiation is directed into a crystal of a type having, along a direction of propagation of the radiation, two sets of a plurality of domains which have non-linear coefficients of opposite signs alternately therealong, said two sets being separated by a central region that is not birefingently phase matched and of a length significantly greater than a length of individual ones of said plurality of domains, and the electric field is cyclically altered through the crystal by application of a cyclically varying voltage across electrodes on opposite sides of the crystal wherein at least one electrode extends only across said central crystal region and not across said two sets of domains.

12. A method according to claim 11 wherein the input radiation is directed into a waveguide formed within the crystal.

13. A method according to claim 1 wherein the output radiation is generated to have a frequency that is twice the frequency of the input radiation.

14. A method according to claim 1 wherein the input radiation directed into the crystal includes coherent radiation of first and second separated frequencies, and wherein the output frequency includes coherent radiation of a third frequency equal to a difference between said first and second frequencies.

15. A method of controlling operation of a non-linear crystal that responds to incident electromagnetic radiation of a first frequency traveling in a direction of an axis thereof to generate electromagnetic radiation of a second frequency that is a multiple of the first frequency, said crystal having a non-linear coefficient that cyclically varies along the direction of said axis in a manner which tends to match the relative phases of the incident and generated radiation within the crystal, comprising:

directing an incident beam of coherent electromagnetic radiation of said first frequency into said crystal in a direction of said axis, thereby to generate a beam of coherent electromagnetic radiation at said second frequency that exits the crystal, cyclically altering an electric field through said crystal for a distance along said axis that includes at least several cycles of said cyclically varying non-linear coefficient, said alteration being accomplished in a manner to generate a corresponding cyclic intensity variation in the output radiation when a conversion efficiency within the crystal between the incident radiation and the generated radiation is not maximized, while generating substantially no cyclic intensity variation in the output radiation when said conversion efficiency is substantially maximized, monitoring the output radiation intensity in order to measure any of said cyclic intensity variation therein, and in response to monitoring some substantial magnitude in said output radiation cyclic intensity variation, adjusting a condition of operation of the crystal in a manner to cause the cyclic intensity variation to approach substantially zero, whereby the conversion efficiency is substantially maximized.

16. A method according to claim 15 wherein the adjusting of a condition of operation includes adjusting a temperature of the crystal.

17. A method according to claim 15 wherein the adjusting of a condition of operation includes adjusting a steady state bias level of an electric field across the crystal.

18. A method according to claim 15 wherein the adjusting of a condition of operation includes adjusting an angle of propagation of the incident radiation beam with respect to the axis of the crystal.

19. A method according to claim 15 wherein the cyclicly varying non-linear coefficient of the crystal includes the sign of the non-linear coefficient.

20. A method according to any one of claims 15–19 which additionally comprises varying said one frequency of the incident radiation beam simultaneously with adjusting the operating condition of the crystal.

21. A variable frequency source of electromagnetic radiation, comprising:

a non-linear crystal that responds to incident electromagnetic radiation of a first frequency traveling in a direction of an axis thereof to generate electromagnetic radiation of a second frequency that is a multiple of the first frequency, said crystal having a non-linear coefficient that cyclically varies along the direction of said axis in a manner which tends to match the relative phases of the incident and generated radiation within the crystal, a pair of electrodes positioned on opposite sides of said crystal and extending in a direction of the crystal axis for a distance that includes at least several cycles of said cyclically varying non-linear coefficient, an oscillator having an output of a cyclically varying electrical waveform that is connected to said electrodes, thereby to generate a cyclically varying electric field through said crystal between the electrodes, a laser source having a variable frequency electromagnetic radiation output beam directed to said crystal as said incident radiation, thereby to generate an output beam of coherent electromagnetic radiation from the crystal with a variable frequency, means positioned in the output beam for generating an electrical signal proportional to a level of intensity of a fixed portion of the intensity of said beam, means receiving said oscillator output waveform and said electrical signal for generating an error signal having a magnitude related to a magnitude of any cyclic variations in the electrical signal and a sign determined by the relative phase of any cyclic variations in the electrical signal and that of the oscillator output waveform, and means responsive to said error signal for adjusting a condition of operation of the crystal in a manner to cause the error signal to approach substantially zero, thereby to maintain substantially maximized a conversion efficiency of the crystal as the frequency of the laser source radiation is changed.

22. The radiation source of claim 21 wherein said operation condition adjusting means includes means responsive to said error signal for adjusting the temperature of said crystal.

23. The radiation source of claim 21 wherein the cyclicly varying non-linear coefficient of the crystal includes the sign of the non-linear coefficient.

24. The radiation source of claim 23 wherein the crystal is formed within a waveguide in a solid state substrate, said pair of electrodes are carried by said substrate, and said oscillator, electrical signal generating means and said error signal means are all formed on said substrate.

* * * * *